Aug. 16, 1932.  W. H. MANNING  1,872,600
BEARING LINER DESIGN
Filed April 27, 1931

Inventor
William H. Manning
By Blackmore, Spencer & Hiatt
Attorneys

Patented Aug. 16, 1932

1,872,600

UNITED STATES PATENT OFFICE

WILLIAM H. MANNING, OF PONTIAC, MICHIGAN, ASSIGNOR TO GENERAL MOTORS CORPORATION, OF DETROIT, MICHIGAN, A CORPORATION OF DELAWARE

BEARING LINER DESIGN

Application filed April 27, 1931. Serial No. 533,218.

The invention relates to improvements in bearings and has particular reference to the bearing halves used to mount the crankshaft and connecting rods of internal combustion engines.

In removing or replacing bearings of crankshafts of internal combustion engines, it has been necessary to remove the oil pan and the bearing caps, and either remove or partially drop the crankshaft in order to make accessible the bearings in the bearing seats of the engine block. This necessitates a large amount of labor and time and is a costly operation. It is an object of the invention to eliminate this costly and time consuming operation.

Bearings are secured in place in the engine block and engine cap by means of dowel pins which extended through the bearing halves and into openings in the bearing supporting member. These dowel pins prevented the rotation of the bearings when the crankshaft was rotated. Another object of the invention is to eliminate the use of dowel pins for in removing the upper bearing half, it has been necessary to drop the crankshaft enough to permit the bearing to drop down off the dowel pin before it could be removed.

The invention is not limited to what is known as the thick backed bearing but is equally useful and practicable with the recently introduced thin backed bearing.

The present invention provides a means for securing bearings in place without the use of dowel pins. The securing means is formed integrally with the bearing halves themselves and prevents the rotation of the bearing in its supporting member. The invention consists in forming a recess in the crankcase of the engine block and a similar recess in the bearing cap. The bearing halves have a lug pressed therefrom, preferably at their meeting or parting lines, and this lug is adapted to fit into the recesses. It has been found in practice that this lug is sufficient to retain the bearing in place, or prevent lateral or longitudinal displacement, and the rotation of the crankshaft will not crush the lug. The lug also centers the bearing in its seat.

Where it is desired to replace a bearing, the removal of the old bearing is accomplished by removing the cap and then fitting a pin in the oil hole in the crankshaft. This pin will strike against the side of the bearing and by slowly rotating the crankshaft by hand, the bearing will be forced from its seat. A new bearing may be placed in the seat by reversing the operation.

Figure 1:
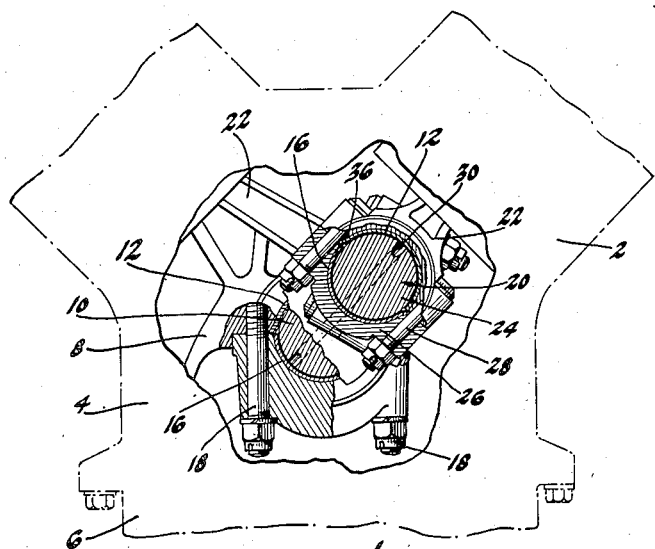
Figure 1 is an end view of an internal combustion engine with parts broken away and shown in section to illustrate the invention.

Referring to Figure 1, the numeral 2 indicates an internal combustion engine as a whole. The engine has the usual crankcase 4 and oil pan 6. The engine has the transverse ribs 8 in which one of the bearings 10 of the crankshaft is positioned in its usual seat. The rib has mounted therein the upper bearing half 12 while the cap 14 has mounted therein the lower bearing half 16. The cap is secured to the rib 10 by means of the bolts 18. The crankshaft is indicated as a whole at 20 while 22 indicates one of the connecting rods of the engine. The connecting rod 22 is held on the crankpin 24 of the shaft 20 by means of the cap 26 and bolts 28. The crankshaft throws are provided with the usual oil holes, one of which is indicated at 30.

Figure 2:
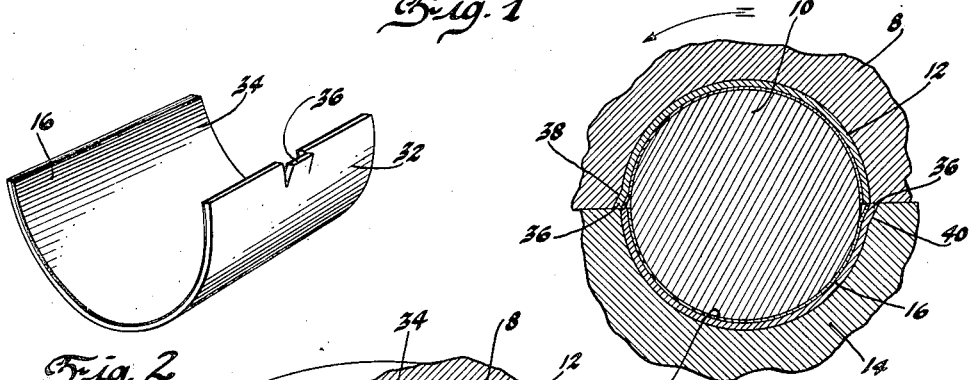
Figure 2 is a perspective view of one of the bearing halves showing the lug formed thereon.

One of the bearing halves of the invention is indicated in Figure 2. This bearing half comprises the backing 32 of steel or brass and the inner liner 34 of babbitt. The Babbitt liner is substantially 1/64 of an inch thick while the backing may be of any desired thickness. One edge of the bearing half 12 or 16 is provided with a pressed out lug 36 which extends away from the outer surface of the bearing.

The rib 8 of the crankcase is provided with a recess 38 and the bearing cap 14 is provided with a similar recess 40.

Figure 3:
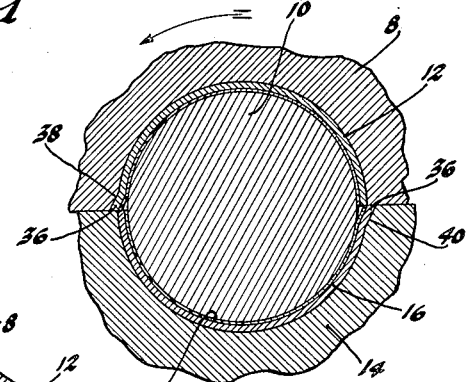
Figure 3 is a sectional view through one of the bearings of the crankshaft showing the bearing halves in position and with the lugs in engagement with their recesses.
Figure 4:
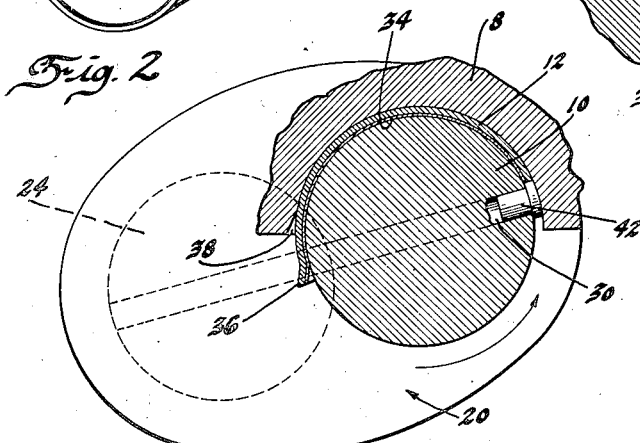
Figure 4 shows the method of removing the upper bearing by the use of a pin in the oil hole of the crankshaft.

The lugs 36 on the bearings 12 or 16 fit into the recesses 38 and 40 when the bearings are assembled as shown in Figures 1 and 3. It is, of course, obvious that the bearings for the crankpin 24 are similar to the main bearings of the crankshaft and similarly are held in place.

It has been found by the use of the projections 36 and recesses 38 and 40 that the bearing will be held in the rib 8 and cap 14 and the rotation of the crankshaft will not turn the bearing or shear or crush the projections 36.

Where it is desired to replace a bearing, the bearing caps 14 or 26 are easily removed and there is no problem in the removal of the bearing half 16 contained therein. With reference to the bearing half 12 and the rib 8, this is removed by inserting a headed pin 42 in the end of the oil groove 30. The head is of a slightly lesser thickness than the overall thickness of the bearing half 12 or 16 and by rotating the crankshaft 20 slowly by hand, the head of the pin 42 will strike against the bearing 12 and force it out of its seat in the rib 8. To place a new bearing in the seat of the rib 8, it is only necessary to reverse the process. That is, a bearing is placed on the crankshaft and the crank rotated in the opposite direction when the head of the pin 42 will force the bearing into position.

The upper and lower bearings of the present invention are similar or duplicates of each other. They are therefore interchangeable and may be used either in the bearing cap or the bearing seat of the engine block.

I claim:

1. The method of removing a shaft bearing portion from its seat consisting of removing the bearing cap to expose the shaft bearing, placing a pin in the oil hole of the shaft, and then rotating the shaft to cause the pin to strike against and move the bearing to turn it out of its seat.

2. The method of placing a shaft bearing in its seat consisting of inserting a pin in a hole in the shaft, placing a bearing half on the shaft, then rotating the shaft to cause the pin to strike against the bearing edge and rotate the bearing into its seat.

In testimony whereof I affix my signature.

WM. H. MANNING.